United States Patent [19]
Jenkins

[11] 3,887,350
[45] June 3, 1975

[54] FLUID COOLING OF GLASS MOLDS

[75] Inventor: Charles W. Jenkins, Toledo, Ohio

[73] Assignee: Owens-Illinois, Inc., Toledo, Ohio

[22] Filed: Feb. 11, 1974

[21] Appl. No.: 441,664

[52] U.S. Cl. .................. 65/267; 65/319; 65/356; 65/374
[51] Int. Cl. ............................................. C03b 9/38
[58] Field of Search ............ 65/356, 374, 360, 319, 65/66, 265, 267

[56] References Cited
UNITED STATES PATENTS

| | | | |
|---|---|---|---|
| 780,863 | 1/1905 | Coleman, Jr. | 65/356 |
| 2,901,865 | 9/1959 | McCormick | 65/356 |
| 3,499,746 | 3/1970 | Blankenship et al. | 65/267 X |

Primary Examiner—Arthur D. Kellogg
Attorney, Agent, or Firm—Steve M. McLary; E. J. Holler

[57] ABSTRACT

A mold for controllably removing heat from a heated mass of thermoplastic material. A split mold is opened to allow removal of a stable article after heat is removed therefrom during a period of time when the mold is closed. Each mold section is made up of three major parts: an insert portion which has a cavity formed therein for defining a part of the final shape of the article; a partial conductive heat transfer barrier sleeve; and an insert holder having a plurality of passages formed therein through which a cooling fluid circulates, the barrier sleeve being positioned in contact with the insert holder and the insert portion and intermediate those two elements, all three elements being assembled together as a complete unit.

10 Claims, 5 Drawing Figures

FLUID COOLING OF GLASS MOLDS

BACKGROUND OF THE INVENTION

This invention generally relates to the cooling of molds to remove heat from a heated mass of a thermoplastic material. More specifically, this invention relates to a mold which has a partial conductive heat transfer barrier positioned between the heated material and that portion of the mold from which the heat is finally removed. Most particularly, this invention relates to a mold of the type described wherein the heat is removed therefrom by a circulating cooling fluid conducted through passages formed in the mold at a location in the path of heat flux after the location of the partial conductive heat transfer barrier.

In the field of forming articles from masses of heated thermoplastic material, a continuing problem is that of heat removal from a mold used to define the desired shape of the article. This problem has become particularly acute in the field of glass container manufacture; in fact, a limitation on the speeds of production has been the ability of low pressure air to remove heat from forming molds. In addition, the low pressure air used requires great volume capacity which has resulted in the generation of objectionable noise levels in the factory environment. Attempts to fluid cool molds by internal circulation of a cooling fluid, water, for example, have met with failure in the past. The primary problem was that the heat removal tended to be selective in the areas of the cooling passages, thus leading to hot and cold spots in the mold. This in turn created bad glass container formation. I have solved this problem by increasing the thermal resistance of the mold by the use of a rather thin sleeve of insulating material. This creates a uniform redistribution of the heat flow or flux in the region of the cooling fluid passages and prevents any localized hot or cold spots from propagating back through the insulating sleeve to the article forming face of the mold.

SUMMARY OF THE INVENTION

My invention is a mold of a particular configuration and the method of cooling heated thermoplastic material such as glass within the mold. The mold has three major components: a mold insert having a cavity for receiving the mass of thermoplastic material and for defining the shape thereof; an insert holder for supporting the mold insert, the insert holder has means formed therein for conveying a cooling fluid therethrough, and a heat insulating sleeve, positioned between the mold insert and the insert holder in contact with substantially the entire interface surface area of both. The insulating sleeve is formed of a material having a heat conductivity value of between one-hundred and twenty times less and ten times less than the heat conductivity value of the mold insert and the insert holder, the mold insert, the insert holder and the sleeve all being assembled together as a unit.

BRIEF DESCRIPTION OF THE DRAWINGS

FIG. 4 is a cross-sectional view, through the thickness thereof, of a composite heat insulating material which can be used as the material for the sleeve shown in FIG. 1.

DETAILED DESCRIPTION OF THE DRAWINGS

Figure 1:
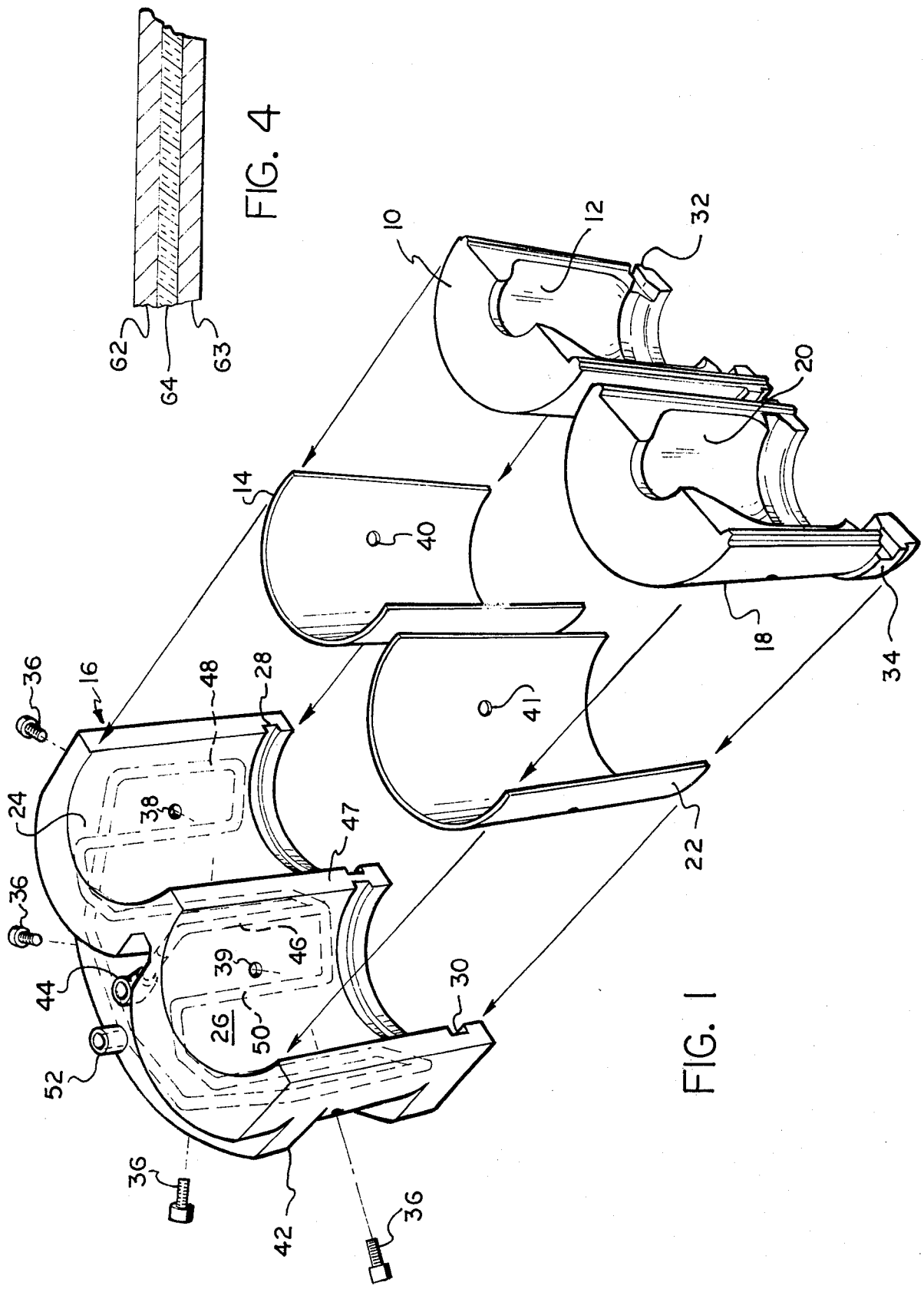
FIG. 1 is an exploded perspective view of a mold half illustrating the present invention.
Figure 5:
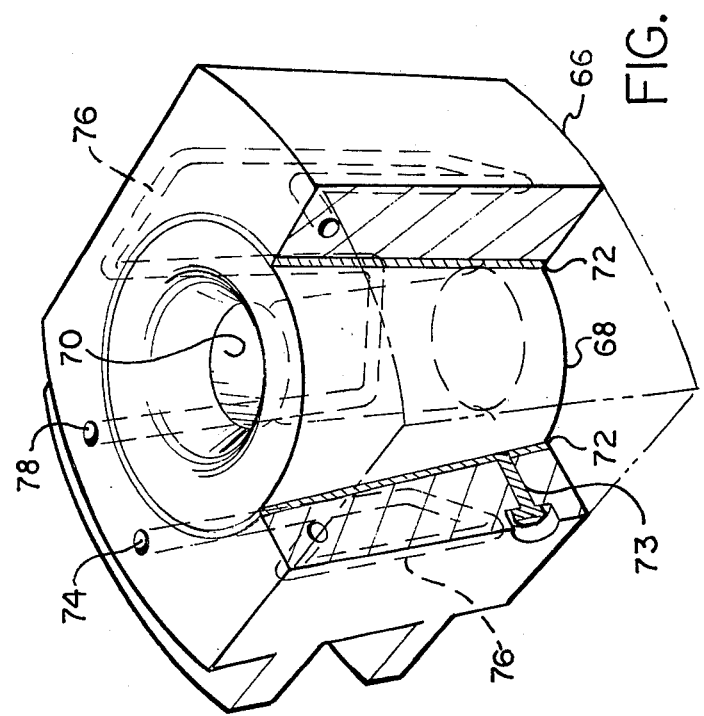
FIG. 5 is a perspective view, partially cut away, of a one-piece mold constructed in accordance with the present invention.

The exploded view shown in FIG. 1 illustrates the present invention. FIG. 1 shows a mold half in an exploded form, but it should be realized that there is a corresponding half to that shown in FIG. 1 which completes an article defining cavity. However, the two halves of the mold are substantially identical and the present invention is illustrated with only a single half in FIG. 1. This invention is illustrated with respect to the forming of glass containers, but it should be realized that the general principles and the apparatus and method involved are applicable to the forming of any heated thermoplastic material from which it is necessary to remove heat to form a stable article of a particular desired configuration. In addition, the fact that the molds are shown as being split into two substantially identical portions does not mean that this is an absolute requirement. The mold could be a single piece, as illustrated in FIG. 5, or the mold could be split into three or more segments. In addition, FIG. 1 illustrates a so-called dual cavity or double cavity mold which makes two articles at a time. However, the present invention will work equally well with a single cavity mold or with a three or more cavity mold. The description to be given herein is sufficiently clear to enable one skilled in the art to modify the teachings given with respect to the dual cavity mold to utilize these teachings with a single cavity mold or with a mold having three or more cavities to obtain the desired results. The present invention is made up of three major components: first, a mold insert or insert portion 10 which has formed in it a cavity 12 which is shaped in the form that it is desired for the heated thermoplastic material to assume. Second, a heat insulating sleeve 14 which is made from a heat insulating material which has a conductivity value of between 120 times and 10 times less than the heat conductivity value of the mold insert 10. Third, an insert holder 16 into which the sleeve 14 and the insert 10 are placed for operational purposes. It is preferable that the insert holder 16 be made of the same material as the mold insert 10, so the relative heat insulating value of the sleeve 14 is the same for both the mold insert 10 and the insert holder 16. It is, however, possible for the mold insert 10 and the insert holder 16 to be made of dissimilar materials, in which event it would be necessary to tailor the precise heat insulating value of the sleeve 14, in a manner to be explained later, to precisely accommodate the heat flow characteristics of the two materials. A presently used material for the mold insert 10 and the insert holder 16 is grey cast iron which has a heat conductivity value of about twenty-five BTU's per hour per foot per degree Fahrenheit. In the embodiment of FIG. 1, there is also a second mold insert 18 having formed therein a shape defining cavity 20 and a second heat insulating sleeve 22. The insert holder 16 has two generally cylindrical shaped cavities 24 and 26 into which the mold inserts 10 and 18 and the sleeves 14 and 22 are respectively inserted in the final assembled configuration. The cavity 24 has a groove 28 formed in its lower portion and the cavity 26 has a corresponding groove 30 formed in its lower portion. The groove 28 cooperates with a flange 32 formed in the lower portion of the mold insert 10 and a flange 34, formed in the lower portion of the mold insert 18, cooperates with groove 30 to assure proper seating of the mold inserts 10 and 18 in the cavities 24 and 26 of the insert holder 16. To secure the mold inserts 10 and 18 and the sleeves 14 and 22 in the insert holder 16, a plurality of threaded bolts 36 are utilized. The number and pattern of the bolts 36 is not particularly critical, and for purposes of illustration in FIG. 1, two bolts 36 are shown as being used to secure each of the insert portions 10 and 18 in their respective cavities 24 and 26. The use of bolts to secure the mold inserts 10 and 18 and the sleeves 14 and 22 is by way of an example, and any other suitable fastening means, such as dowel pins, could also be used. Holes, such as those shown at 38 and 39 in the holder 16 are drilled completely through the holder. Corresponding aligned holes such as those shown at 40 and 41 are formed in the insulating sleeves 14 and 22. The bolts 36 are then inserted through the holes 38, 39, 40 and 41 and engage in threaded openings, which are not visible in FIG. 1, formed in the back of the mold inserts 10 and 18. The result of this type of assembly procedure is that the sleeves 14 and 22 are in contact with substantially the entire interface surface area of both the mold inserts 10 and 18 and the cavities 24 and 26, of the holder 16, into which they fit. This assures good thermal contact between the insert holder 16 and the mold inserts 10 and 18 which it carries. The mold insert holder 16 also has a hanger flange 42 which is used to connect it to conventional mold hangers of the type used on IS glass forming machines. The IS glass forming machine is well known to those skilled in the art of glass container manufacture and is disclosed in U.S. Pat. No. 1,911,119, the teachings of which are hereby incorporated by reference. The cited patent also clearly illustrates the operating environment of the mold, shown in the exploded view of FIG. 1 of the present application. Another important aspect of this invention is that the holder 16 is provided with a plurality of interconnected passages through which a cooling fluid is passed. The cooling fluid may be a compressed gas, such as compressed air, but preferably is a liquid which may be used in a recirculating system. In terms of economy and efficiency water has proved to be the most practical cooling fluid. The cooling fluid enters the holder 16 through an inlet 44 and then passes through a common passageway 46 which runs in a generally downward direction adjacent to a web portion 47 of the insert holder 16. This web portion 47 is one of the most difficult portions of a glass container mold, of the dual cavity type, to cool even with the currently used air cooling systems. This is because this portion of the mold insert holder 16 is the most remote from contact with an air flow in an air cooling system. In contrast thereto, the fluid cooling system of the present invention allows the inlet passage 46 to be placed in close proximity to the web portion 47 thus allowing better control of the temperature of this portion of the insert holder 16. At its bottom, the inlet passage 46 splits into a series of right-hand passages 48 and a corresponding series of left-hand passages 50. Typically, these passages 48 and 50 are formed by drilling into the insert holder 16 and their entrance and/or exit holes are then plugged with suitable metal plugs to confine the movement of cooling fluid to the interior of the insert holder 16. The details of the precise manner of drilling these passages are not shown since such a matter is well within the abilities of any mold maker skilled in the art. It may be seen that both the right-hand passages 48 and the left-hand passages 50 generally have three vertical loops and two horizontal loops connecting the vertical loops. However, this precise configuration is not necessarily critical and other configurations of the passages could be possible to obtain the desired results. The basic principle involved in selecting the number and size of these passages is the ability to withdraw heat that has passed through sleeves 14 and 22 into the insert holder 16 at a known, precise rate. Thus, for the manufacture of different sizes and/or configurations of glass containers it will be necessary to reconfigure the cooling passages themselves. This is not a matter which requires extensive experimentation, but rather may be calculated through the use of the wellknown radial conductive heat transfer equations, taking into account the effect of the heat insulating sleeves 14 and 22. The right-hand passages 48 and the left-hand passages 50 join at the rear portion of the holder 16 where the cooling fluid exits through a common outlet port 52.

Figure 2:
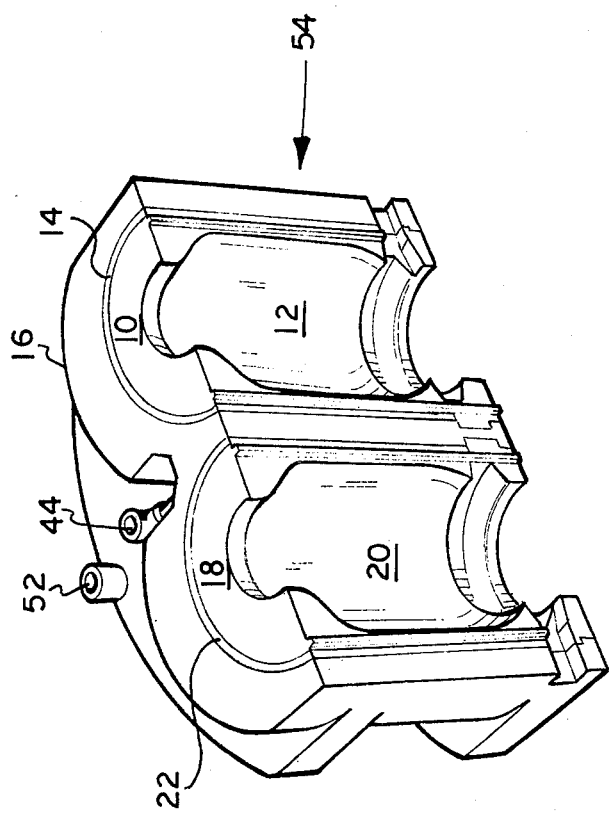
FIG. 2 is a perspective view of the mold half of FIG. 1 in an assembled configuration.

FIG. 2 illustrates a complete mold half 54, which is the assembled pieces shown in the exploded view of FIG. 1.

Figure 3:
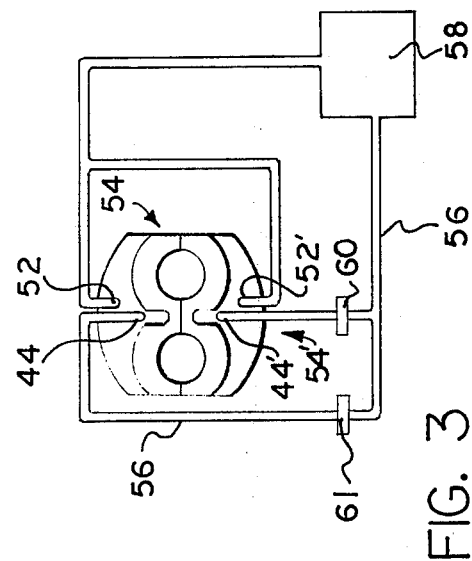
FIG. 3 is a schematic diagram of a cooling fluid control system for a complete mold constructed in accordance with the present invention.

FIG. 3 illustrates a complete cooling control system for the forming of glass containers using molds which are constructed in accordance with the mold shown in FIG. 1. The mold half 54 is shown cooperating with a corresponding and substantially identical mold half 54'. In FIG. 3, the mold halves 54 and 54', are closed as they normally would be during the forming of glass container. The inlets to the mold halves 54 and 54', which are respectively designated as 44 and 44', are connected through suitable piping 56 to a fluid cooling and pumping unit 58. The outlets from the mold halves 54 and 54', respectively designated as 52 and 52', are connected to the inlet of the fluid cooling and pumping unit 58. Note that in the outlet lines from the fluid cooling and pumping unit 58, prior to the inlets 44 and 44', are inserted control valves 60 and 61. These control valves 60 and 61 serve as a means for controlling the flow rate of the cooling liquid to thereby precisely control the rate of heat removal from the mold halves 54 and 54'. Control of flow is not an absolute requirement for proper operation of molds of this type, but is desirable in that it is often not possible to precisely define the heat transfer coefficient of the sleeves 14 and 22 and the configuration of the passages 48 and 50 with the degree of accuracy necessary to provide mold cooling characteristics that are necessary to form glass containers at the desired rate. Thus it is necessary to control the flow rate of the fluid with the valves 60 and 61 to obtain the desired rate of heat transfer from the molten glass. In addition, it is possible to less precisely control this rate of heat flow using only a single control valve which then throttles or controls the flow rate of cooling fluid to both mold halves 54 and 54' uniformly. The schematic flow system shown in FIG. 3 provides a control flexibility that allows individual control of the fluid flow rate for each of the mold halves 54 and 54' and thus represents a probable maximum in the degree of required control for the cooling fluid.

FIG. 4 illustrates a cross-section, on an enlarged scale, of a material which has proven to be particularly useable for the heat insulating sleeves 14 and 22. Before proceeding with a detailed description of this particular material, the basic purpose behind the insulating sleeves 14 and 22 should be fully understood. As pointed out previously, one of the basic problems with prior art fluid cooled glass molds was the tendency for the mold to develop hot and cold spots and thus not cool the glass within the mold uniformly. The insulating sleeves 14 and 22 being of a material that is relatively non-conductive to heat thus in a sense serve as an impedence to the conduction of heat from the mold insert 10 into the bulk of the material making up the insert carrier 16. By impeding the conduction of heat, the sleeves 14 and 22 function to distribute the heat flow from the glass throughout the insert carrier 16 so that it is possible to achieve a relatively uniform removal of heat from the glass being formed. Thus the sleeves 14 and 22 do not act as a total barrier to heat transfer but rather are a partial conductive heat transfer barrier which lies in the path of heat flow from the glass or any thermoplastic material being formed, and serve to uniformly distribute this heat flow resulting in an efficient removal of the heat from the total mold assembly. As was pointed out, one particular material, a three-layer composite, has proven to be most effective for the sleeves 14 and 22. However, other materials are conceivably workable which will provide the partial heat barrier effect and which will still act to distribute the heat conducted across them in a uniform manner. For example, fiberglass could be used for such a purpose, but has the undesirable characteristic of being relatively bulky or thick for a given degree of heat impedence and also tends to compress non-uniformly in a dense layer when forced into intimate contact with abutting surfaces such as the cavity 38 and the insert portion 10. Likewise, an air gap could also conceivably be used, but presents the problem of requiring a very small, precise gap to give the desired resistance. For example, an air gap of 0.0015 inch would give a typically desired amount of heat flow resistance; this is much too small a value for commercial practicality. The most suitable material which I have found to date for this purpose is a three-layer composite material which has two separate outer layers 62 and 63 made of a graphite sheet material such as "Grafoil" (a registered trademark of the Union Carbide Corporation). The graphite is furnished in sheet form of thicknesses varying from five-thousandths of an inch to is to 20 thousandths of an inch. The third or inner layer of the composite material is an asbestos fabric 64 which may be a material designated as Raybestos A–56 which is furnished by the Raybestos-Manhattan Corporation.

Table 1 below clearly illustrates a number of possible combinations of these three materials and the resulting overall heat conductivity values. Table 1 teaches that it is possible, by selecting various combinations of thickness of graphite layers and asbestos cloth layers to tailor the heat transfer characteristics of the composite material to a desired degree. This is an important characteristic since various sizes of glass containers will require different rates of heat impedence or attenuation to assure uniform distribution for removal by the cooling fluid.

TABLE 1

| | Graphite Layer Thickness | Asbestos Cloth Thickness | Graphite Layer Thickness | Heat Conductivity Composite BTU/Hr. Ft°F. |
|---|---|---|---|---|
| A | 0.010 inch | 0.031 inch | 0.010 inch | 0.352 |
| B | 0.015 inch | 0.031 inch | 0.010 inch | 0.382 |
| C | 0.015 inch | 0.031 inch | 0.015 inch | 0.410 |
| D | 0.010 inch | 0.015 inch | 0.010 inch | 0.424 |
| E | 0.015 inch | 0.015 inch | 0.010 inch | 0.467 |
| F | 0.015 inch | 0.015 inch | 0.015 inch | 0.507 |
| G | 0.010 inch | 0.008 inch | 0.010 inch | 0.578 |
| H | 0.015 inch | 0.008 inch | 0.010 inch | 0.646 |
| I | 0.015 inch | 0.008 inch | 0.015 inch | 0.705 |

As pointed out earlier, one may compare the values shown in Table 1 with typical heat conductivity values of cast iron of 25 BTU's per hour per foot per degree Fahrenheit. While the lowest value shown in Table 1 is 0.352, this value may be reduced by as much as 40 percent to a value of approximately 0.21 by removing portions of the sleeves 14 and 22 such as by drilling a number of holes in these sleeves. While it might appear that doing so would tend to create non-uniform regions of heat transfer, it has been found that up to about 40 percent of the material may be so removed without significantly disturbing the uniformity of heat transfer into the insert holder 16. The heat conductivity of the graphite material alone is about 1.5 BTU per hour per foot per degree Fahrenheit, while the asbestos alone has a heat conductivity value of 0.25 BTU per hour per foot per degree Fahrenheit. Thus, the use of the graphite material alone as a sleeve would give a sleeve having a heat conductivity value about 16.7 times less than that of cast iron. Using the technique of removing part of the sleeve by drilling holes, this ratio can be reduced to 10:1. The use of the composite material having a heat conductivity value of 0.21 will give a sleeve having a heat conductivity value about 120 times less than that of cast iron. It should be apparent that modification of the material, as demonstrated in Table 1, would allow maintenance of this range of about 120 times to 10 times for mold materials other than cast iron. It should also be noted from Table 1 that the greatest thickness of the composite materials noted is only sixty one thousandths of an inch thick. This is a relatively thin layer of material which has very significant importance in allowing this type of heat removal system to operate properly. It is thus possible to incorporate a water cooling system into a glass forming mold which will fit within the physical limits of present commercial forming machines. In a sense, the very thin layer presented by the sleeves 14 and 22 acts as though it were a considerable volume of cast iron, in terms of the impedence of the heat flow and the uniform redistribution of the total heat flux. Prior art attempts to use water cooling for glass forming molds suffered from the inability to locate the passages in which the water circulated for enough away from the molten glass being formed to permit the heat flux to become uniformly distributed at the point of removal. The three part construction of the invention has accomplished this goal by using the three-layer laminated material illustrated in FIG. 4. Another advantage of this particular configuration of material is that the outer graphite layers 62 and 63 are somewhat compressible and when the insert portions 10 and 18 are tightly secured into the insert holder 16 with the sleeves 14 and 22 positioned therebetween the graphite material is compressed against both the interface surface of the cavities 24 and 26 and the back portions of the insert portions 10 and 18 which are in contact with the sleeves 14 and 22. This intimate contact aids in the uniform transfer of heat from the mold inserts to the mold holders and the previously described circumferential distribution of the heat into the mold holders so that the cooling system for the holders is effective to uniformly remove heat. It is important to realize that the composite material of FIG. 4 will maintain a uniform heat conductivity under compressive loads of from one hundred pounds per square inch to fifteen hundred pounds per square inch. This is important because the inserts 10 and 18 and the insert holder 16 expand as they are heated by the molten glass. This tends to compress the sleeves 14 and 22 between them and could lead to changes in the heat conductivity value of the composite material of the sleeves 14 and 22 if this material were not, as explained, relatively insensitive to compressive loading. This expansion further contributes to the intimate contact of the various surfaces as previously explained.

FIG. 5 illustrates a type of mold sometimes used in forming parisons or blanks in a glass container manufacturing process. U.S. Pat. No. 3,024,571 shows a forming machine that operates on the "solid" or one-piece blank mold principle. In FIG. 5, an insert bolder 66 is formed in one piece. This type of insert holder 66 is moved vertically upward until the parison is cleared and then away from the parison so that it may be transferred. The parison cavity 70 is the shape of the interior of a one-piece insert portion 68 that is carried by the insert holder 66. As was the case in the embodiment previously explained, a sleeve of a thermally insulating material 72 is positioned between the mold insert portion 68 and the insert holder 66. The sleeve 72 is preferably made of the composite material clearly described with reference to FIG. 4. The sleeve 72 may be held in place with a plurality of screws such as the screw 73 shown in FIG. 5. The operational characteristics of the one-piece blank mold shown in FIG. 5 are essentially identical with those previously described with respect to the embodiments shown in FIGS. 1 and 2. That is, the sleeve 72 acts as a partial barrier to conductive heat transfer and uniformly distributes the heat from a charge of glass held in the cavity 70 of the mold insert 68 so that it can be removed by a cooling fluid circulating through the holder 66. The cooling fluid enters the insert holder 66 through an inlet port 74 and circulates through a series of inter-connected passages 76 formed or drilled within the insert holder 66. The cooling fluid then exits from the insert holder 66 through an outlet port 78. It may be recirculated in a manner as shown in and described in FIG. 3, or the fluid again may be a pressurized gas such as air which is simply used once and then exhausted. In either case, the mold shown in FIG. 5 will operate in precisely the same manner as those previously described, and again will allow the benefits of fluid mold cooling to be used in circumstances which had in the past prevented the use of internally circulating cooling fluid.

I claim:

1. A split mold for forming heated thermoplastic materials wherein each mold section comprises, in combination:
   an insert portion having a front face including a cavity shaped in the form desired for the thermoplastic material to assume and a rear face;
   an insert holder, substantially surrounding said rear face of said insert portion, having formed therein a plurality of inter-connected fluid passages, said passages having an inlet and an outlet; and
   a heat insulating sleeve, positioned between said insert portion rear face and said insert holder and in contact with substantially the entire interface area of both, said inter-connected passages being positioned proximate to but separated from said heat insulating sleeve, said insulating sleeve being formed of a material having a heat conductivity value of between one hundred and twenty times less and ten times less than the heat conductivity value of the material of said insert portion and said insert holder, said insert portion, heat insulating sleeve and insert holder being secured together as a unit.

2. Apparatus for controllably removing heat from a mass of heated thermoplastic material to thereby form a stable item of a particular configuration, comprising, in combination:
   a split mold, each section of said mold having an insert portion with a front face including a cavity for containing the mass of thermoplastic material and defining the shape thereof and a rear face, and an insert holder to which said insert is attached, said insert holder substantially surrounding said rear face of said insert portion, said insert holder having formed therein a plurality of inter-connected passages having an inlet and an outlet;
   a sleeve of heat insulating material positioned between said insert portion rear face and said insert holder and in contact with substantially the entire interface surface area of both, said inter-connected passages being positioned proximate to but separated from said heat insulating sleeve, said insulating sleeve being made of a material having a heat conductivity value between 120 times less and 10 times less than the heat conductivity value of the material of said insert portion and said insert holder; and
   means for supplying a cooling fluid to the inlet of said plurality of inter-connected passages and for exhausting the heated fluid from the outlet of said plurality of inter-connected passages.

3. The apparatus of claim 2 further including:
   means, connected intermediate said inlet and said means for supplying a cooling fluid, for controlling the flow rate of said cooling fluid to thereby precisely control the rate of heat removal from said mold.

4. The apparatus of claim 2 wherein said cooling fluid is a liquid and further including:

means, connected to the outlet of said plurality of inter-connected passages, for cooling said heated fluid, said cooled fluid thereafter serving as the supply for said inlet of said plurality of inter-connected passages to thereby define a closed fluid circulation system.

5. The apparatus of claim 4 further including:

means, connected intermediate said inlet and said cooling means, for controlling the flow rate of said cooling liquid to thereby precisely control the rate of heat removal from said mold.

6. A mold for controllably removing heat from a mass of heated thermoplastic material which comprises, in combination:

a mold insert having a front face including a cavity for receiving said mass of heated thermoplastic material and for defining the shape of said thermoplastic material and a rear face;

an insert holder, substantially surrounding said rear face of said mold insert, for carrying said mold insert, said insert holder having formed therein a plurality of interconnected cooling fluid passages, said passages having an inlet and an outlet; and a heat insulating sleeve, positioned between said mold insert rear face and said insert holder and in contact with substantially the entire interface surface area of both, said inter-connected passages being positioned proximate to but separated from said heat insulating sleeve, said insulating sleeve being formed of a material having a heat conductivity value of between 120 times less and 10 times less than the heat conductivity value of the material of said mold insert and said insert holder, said mold insert, said heat insulating sleeve and said insert holder being assembled together as a one-piece mold.

7. A mold for controllably removing heat from a mass of heated thermoplastic material which comprises, in combination:

a mold insert having a front face including a cavity for receiving said mass of heated thermoplastic material and for defining the shape of said thermoplastic material and a rear face;

an insert holder, substantially surrounding said rear face of said mold insert, for carrying said mold insert, said insert holder having formed therein a plurality of interconnected cooling fluid passages, said passages having an inlet and an outlet; and a heat insulating sleeve, positioned between said mold insert rear face and said insert holder and in contact with substantially the entire interface surface area of both, said inter-connected passages being positioned proximate to but separated from said heat insulating sleeve, said insulating sleeve being formed of a material having a heat conductivity value substantially less than the heat conductivity value of the material of said mold insert and said insert holder, said mold insert, said heat insulating sleeve and said insert holder being secured together as a unit.

8. The mold of claim 7 wherein said heat insulating material is a multi-layer composite material.

9. The mold of claim 7 wherein said heat insulating material comprises:

at least one layer of graphite sheet material; and
at least one layer of asbestos fabric material.

10. The mold of claim 9 wherein the total combined thickness of said graphite sheet and said asbestos fabric is between eighteen-thousandths of an inch and sixty-one thousandths of an inch.

* * * * *